(12) United States Patent
Delamarche

(10) Patent No.: US 8,051,878 B2
(45) Date of Patent: Nov. 8, 2011

(54) MAGNETIC VALVES FOR PERFORMING MULTI-DIMENSIONAL ASSAYS USING ONE MICROFLUIDIC CHIP

(75) Inventor: Emmanuel Delamarche, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 12/329,551

(22) Filed: Dec. 6, 2008

(65) Prior Publication Data

US 2010/0143193 A1 Jun. 10, 2010

(51) Int. Cl.
*F15C 1/04* (2006.01)
(52) U.S. Cl. ............... 137/831; 137/614.11; 137/862; 251/65; 251/129.03; 251/129.14
(58) Field of Classification Search ............ 251/65, 251/129.03, 129.14; 137/825, 829, 831, 137/861, 862, 613, 614.11
See application file for complete search history.

(56) References Cited

U.S. PATENT DOCUMENTS

| | | | |
|---|---|---|---|
| 5,052,429 A * | 10/1991 | Yoo | 137/38 |
| 6,398,183 B1 * | 6/2002 | Kerger et al. | 251/65 |
| 6,606,922 B2 | 8/2003 | Case et al. | |
| 6,802,489 B2 | 10/2004 | Marr et al. | |
| 6,981,518 B2 | 1/2006 | Gilbert et al. | |
| 7,338,028 B2 * | 3/2008 | Zimmerling et al. | 251/7 |
| 2004/0265150 A1 | 12/2004 | McElfresh et al. | |
| 2005/0116798 A1 | 6/2005 | Bintoro et al. | |
| 2006/0245933 A1 | 11/2006 | Balch et al. | |
| 2010/0139797 A1 * | 6/2010 | Delamarche | 137/806 |
| 2010/0140517 A1 * | 6/2010 | Delamarche | 251/65 |

* cited by examiner

*Primary Examiner* — Craig Schneider
(74) *Attorney, Agent, or Firm* — Daniel P. Morris

(57) ABSTRACT

An apparatus for performing multi-dimensional assays using a microfluidic chip is presented. The apparatus comprises of two crossing series of micro-channels on the microfluidic chip. The apparatus further comprises of a plurality of magnetic valves placed at the crossings and a guiding magnet. When an operator places the guiding magnet in a vicinity of the chip, the guiding magnet produces a proximal magnetic field gradient at a location of each of the plurality of magnetic valves. At the first micro-channel crossing, a magnetic valve controls fluid flow in the first micro-channel, and another magnetic valve controls fluid flow in the second micro-channel at the first micro-channel crossing. Each magnetic valve comprises a magnetic bead and a cavity on the chip next to a corresponding micro-channel section.

1 Claim, 8 Drawing Sheets

MAGNETIC VALVES FOR PERFORMING MULTI-DIMENSIONAL ASSAYS USING ONE MICROFLUIDIC CHIP

This application is related to 2 other co-pending applications (but different inventions), with same assignee and common inventor(s), titled "Magnetically actuated microfluidic mixers" and "One-step flow control for crossing channels".

BACKGROUND OF THE INVENTION

Over the past several decades, some technologies have been developed to control or measure the flow of fluids. Design of many aerospace, chemical, and mechanical systems have been dependent on assessment of amount of fluid passed a certain point in the process or in the equipment. However, the available methods or equipment are most efficient in the conventional ranges used in the established industry.

In microfluidic devices, as used in emerging technologies, the features and passages of flows are extremely small, hence, extra forces come to play and appear in the governing laws of the fluid flow. Furthermore, in life sciences, samples and reagents are frequently expensive and/or available in very limited quantities.

Capillary-driven microfluidic chips enable minute amounts of biological samples to be analyzed. These differences have created the necessity of new designs for specialized flow control. Chips have been developed by IBM® for high-sensitivity and low-volume immunoassays, reserved for high-end assays.

A high level of expertise and too many steps are required for taking advantage of the full spectrum of possibilities offered by micromosaic immunoassays. They necessitate two expensive chips, which poses a strong obstacle to automation which is critically needed for using these chips and getting high-quality data. Each chip must be cleaned and treated with chemicals to have appropriate surface chemistry.

New chips, which are being made, are very large and therefore expensive. Furthermore, these chips cannot be reused indefinitely because of contamination, dust particles, scratches, etc. In order to use only one chip for these devices, the microchannels on the chip's surface need to cross each other. Microfluidics having crossing channels can bring various liquids for analysis in one area.

However, the liquids must be passed in the right sequence, at the right time and using the right volume of solution. Typically, actuators or valves are used to stop or let a liquid pass in a microchannel. As one of their drawbacks, actuators are expensive to fabricate and necessitate peripheral equipment. Magnetically actuated valves are simpler to fabricate and actuate than many other types of valves. The act of actuation can be done in them by as simply as applying an external magnetic field.

This is an issue for magnetic valves that are used to control the flow of liquid at areas where microchannels cross.

SUMMARY OF THE INVENTION

In one embodiment, an apparatus for performing multi-dimensional assays using a microfluidic chip is presented. The apparatus comprises of two series of micro-channels on the microfluidic chip. The first series of micro-channels crosses the second series of micro-channels at a plurality of micro-channel crossings on the microfluidic chip. The apparatus further comprises of a plurality of magnetic valves and a guiding magnet.

The guiding magnet produces a proximal magnetic field gradient at a location of each of the plurality of magnetic valves when an operator places the guiding magnet in a vicinity of the chip. A first magnetic valve of the plurality of magnetic valves controls fluid flow in the first micro-channel at the first micro-channel crossing, and a second magnetic valve of the plurality of magnetic valves controls fluid flow in the second micro-channel at the first micro-channel crossing.

Each magnetic valve of the plurality of magnetic valves comprises a magnetic bead and a cavity on the chip next to a corresponding micro-channel section.

DETAILED DESCRIPTION OF THE PREFERRED EMBODIMENTS

In one embodiment, an apparatus for performing multi-dimensional assays using a microfluidic chip is presented. The apparatus comprises of two series of micro-channels on the microfluidic chip where the first series of micro-channels crosses second series of micro-channels at a series of micro-channel crossings. In this embodiment, the apparatus further comprises of a series of magnetic valves and a guiding magnet.

In this example, the guiding magnet produces a proximal magnetic field gradient at a location of each of the magnetic valves when an operator places the guiding magnet in a vicinity of the chip. At a given micro-channel crossing, a first magnetic valve controls fluid flow in the first micro-channel, and a second magnetic valve controls fluid flow in the second micro-channel. Each magnetic valve comprises a magnetic bead and a cavity on the chip next to a corresponding micro-channel section.

In this embodiment, the magnetic bead comprises: a magnetic volume element, which forces the magnetic bead to move along a cavity length of the cavity in response to the proximal magnetic field gradient, and a bead surface cover, which provides chemical resistance and reduces friction and stiction of the magnetic bead within the cavity.

In one embodiment, the cavity length is perpendicular to the corresponding micro-channel section, and the cavity length has a closed end away from the corresponding micro-channel section and an open end at the corresponding micro-channel section. Each magnetic valve is at an ON state (604), if the magnetic bead is at the closed end of the cavity length allowing fluid flow through the corresponding micro-channel section.

In one embodiment, each magnetic valve is at an OFF state (603), if the magnetic bead is at the open end of the cavity length blocking fluid flow through the corresponding micro-channel section.

In this embodiment, the vicinity of the chip comprises a plurality of guiding magnet position ranges. The operator repositions guiding magnet within the plurality of guiding magnet position ranges in order to actuate the plurality of magnetic valves simultaneously. If the guiding magnet is within an ON-OFF position range of the plurality of guiding magnet position ranges, then simultaneously the first magnetic valve is at the ON state, and the second magnetic valve is at the OFF state.

In this example, if the guiding magnet is within an OFF-ON position range of the plurality of guiding magnet position ranges, then simultaneously the first magnetic valve is at the OFF state, and the second magnetic valve is at the ON state.

Figure 1:
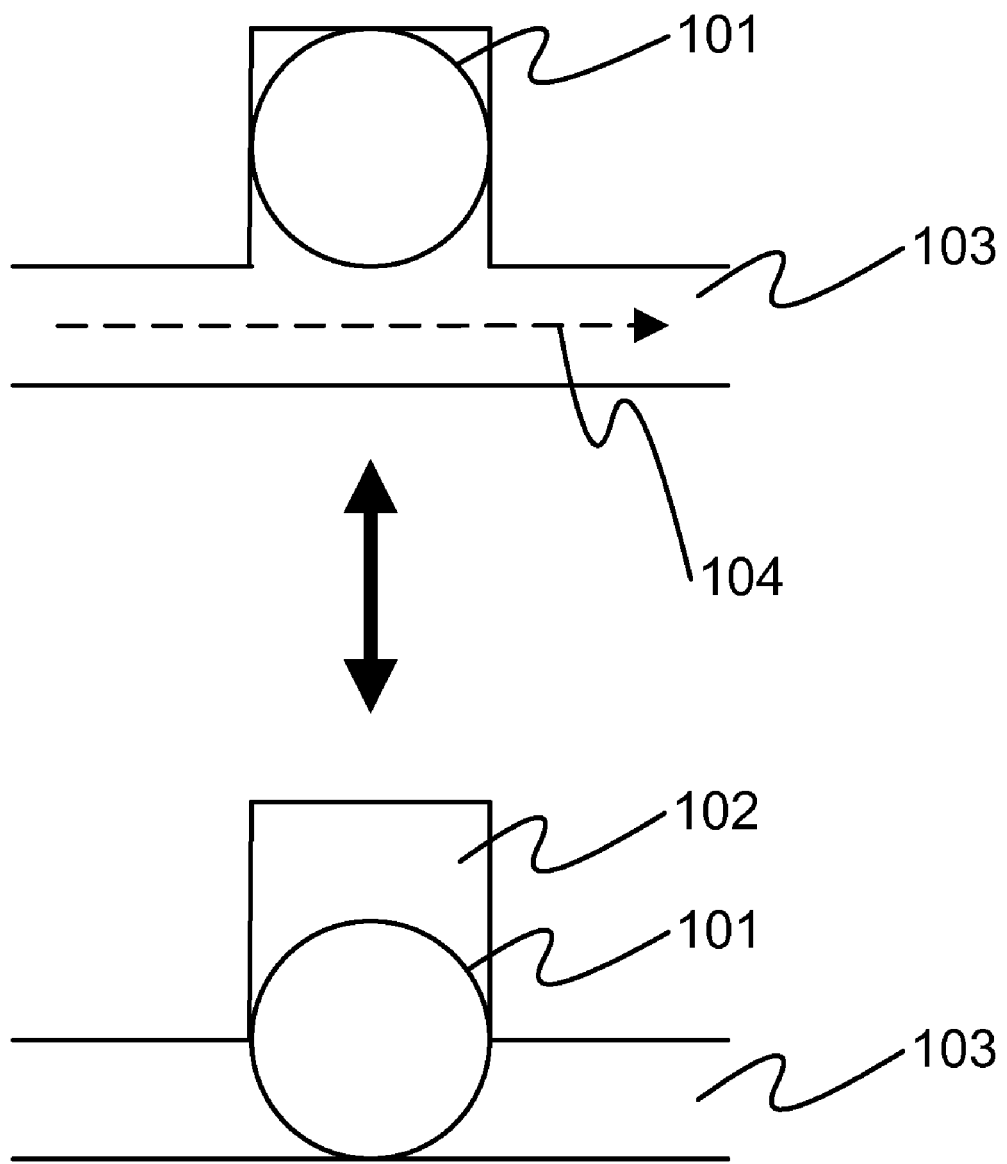
FIG. 1 illustrates schematically the mechanism of closing the microchannel using a bead.

In one embodiment of the present invention, as shown in FIG. 1, a particle (101) having a magnetic volume element is moved in a proximal magnetic field gradient, from open (FIG. 1 top) position to close (FIG. 1 bottom) position. When in open position, the bead (101) allows for fluid flow (104) in the microchannel (103) and when it is in close position, it forms a cavity (102) and blocks the flow of liquid thus functioning as a valve. In the current example, a magnetic valve comprises of a bead (101), a cavity (102), and a microchannel (103) as represented by items 205 and 206 in FIGS. 2 and 3.

The particle can be, for example, a polystyrene bead containing an iron oxide core with an overall diameter of 1-20 micrometer with an organic shell. Density, size, color, fluorescence, surface charges and/or chemistry of the particle (101) can be well defined. As an example, the bead can be covered by perfluorinated layer (2-5 nm thick) to minimize friction and stiction and provide chemical resistance.

In one embodiment, external magnetic element (201) can be from a rare earth alloy and beads can have dyes to allow direct visual control of the state of the valve. Beads can be placed with high control in cavities using "Self-Assembly, Transfer and Integration (SATI)". In this embodiment, multiple beads or coated particles can be used for one valve, helping to relax positioning and fabrication issues, and improving efficiency of closed state.

In one embodiment, in addition, using multiple beads provides the possibility of having multi-state valves which are capable to open or close multiple passages simultaneously. In other embodiments, several valves can be placed in series to improve sealing efficiency. Furthermore, embodiments of this invention can be applied to create autonomous capillary systems with flow control.

Figure 2:
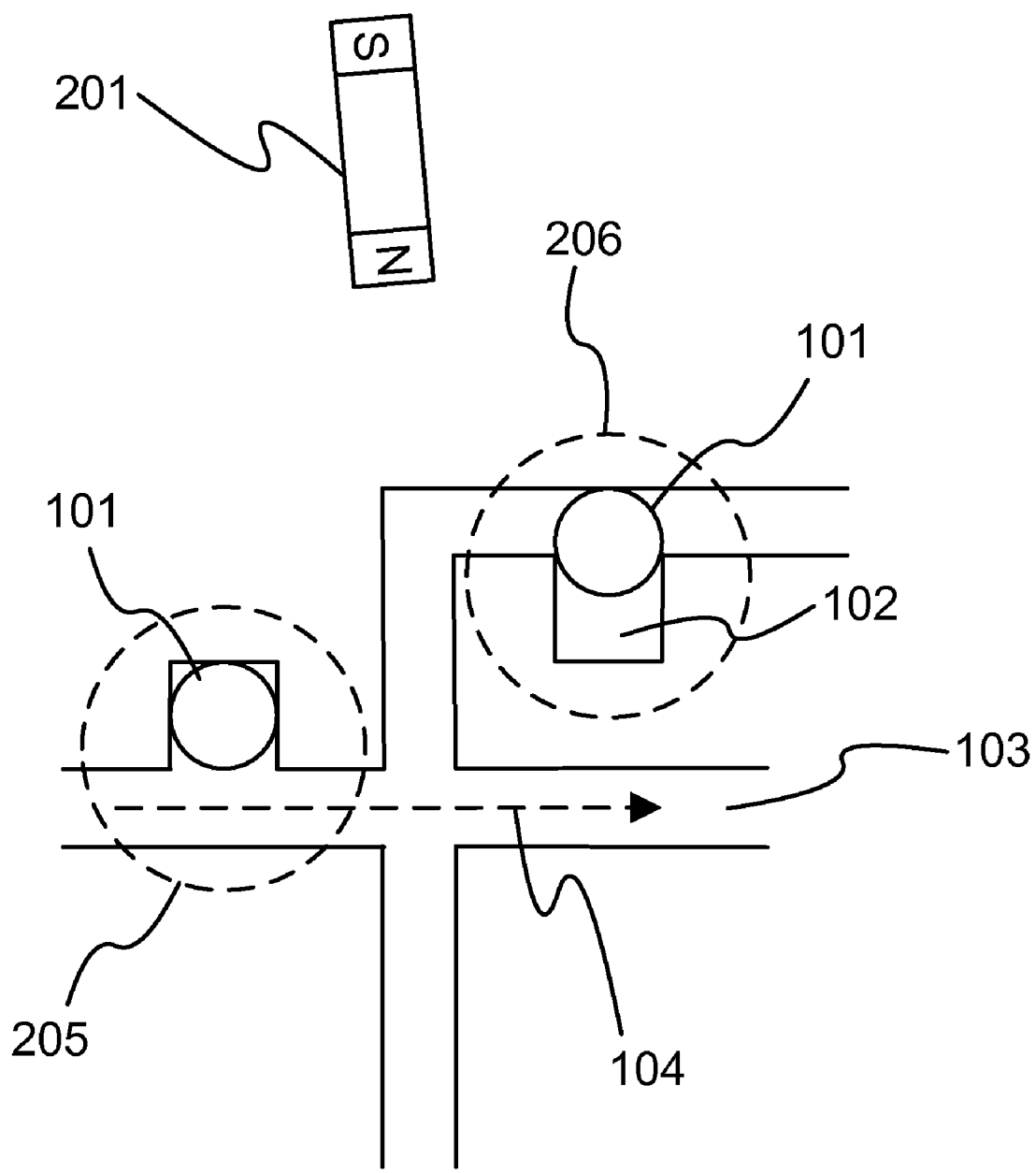
FIG. 2 illustrates schematically an application of the present invention at a crossing of two microchannels to allow a horizontal flow.
Figure 3:
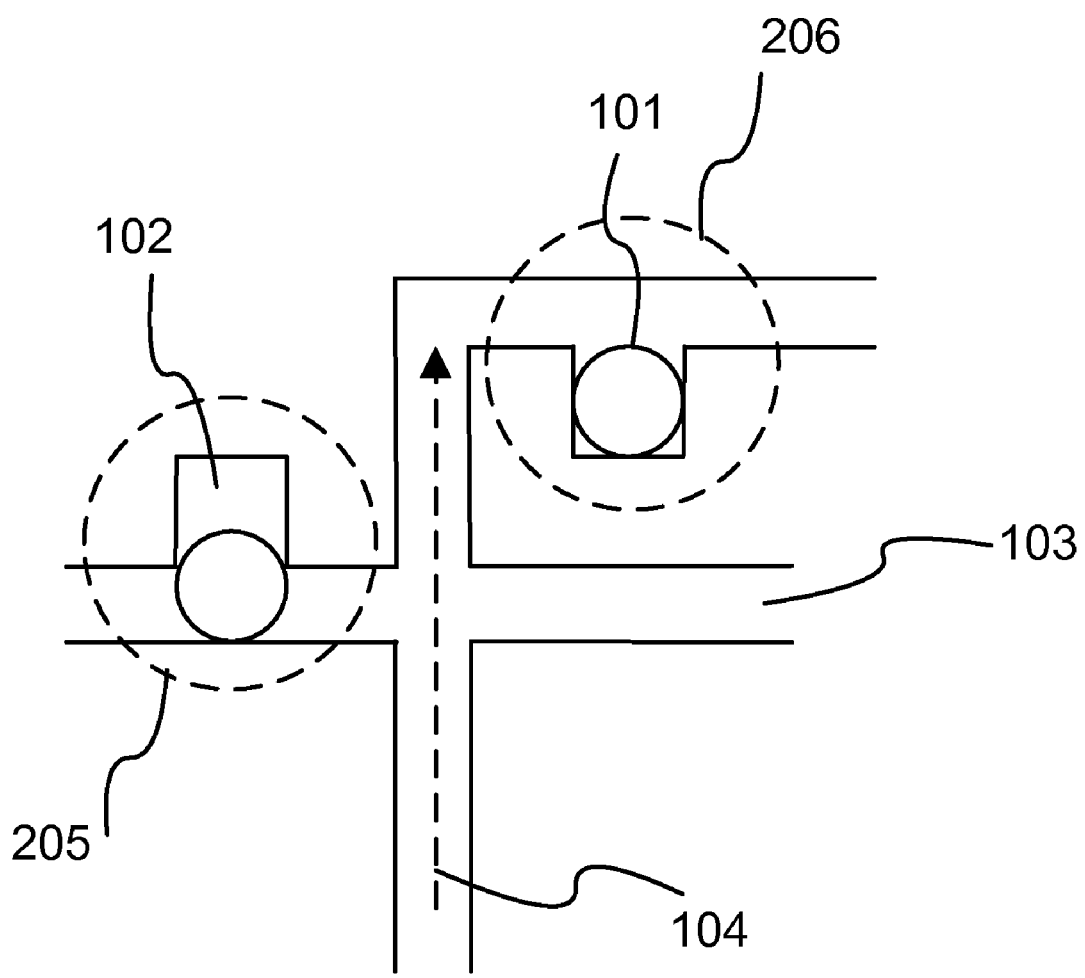
FIG. 3 illustrates schematically another application of the present invention at a crossing of two microchannels to allow a vertical flow.
Figure 3:
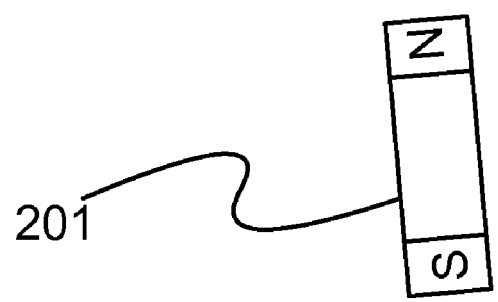
Figure 4:
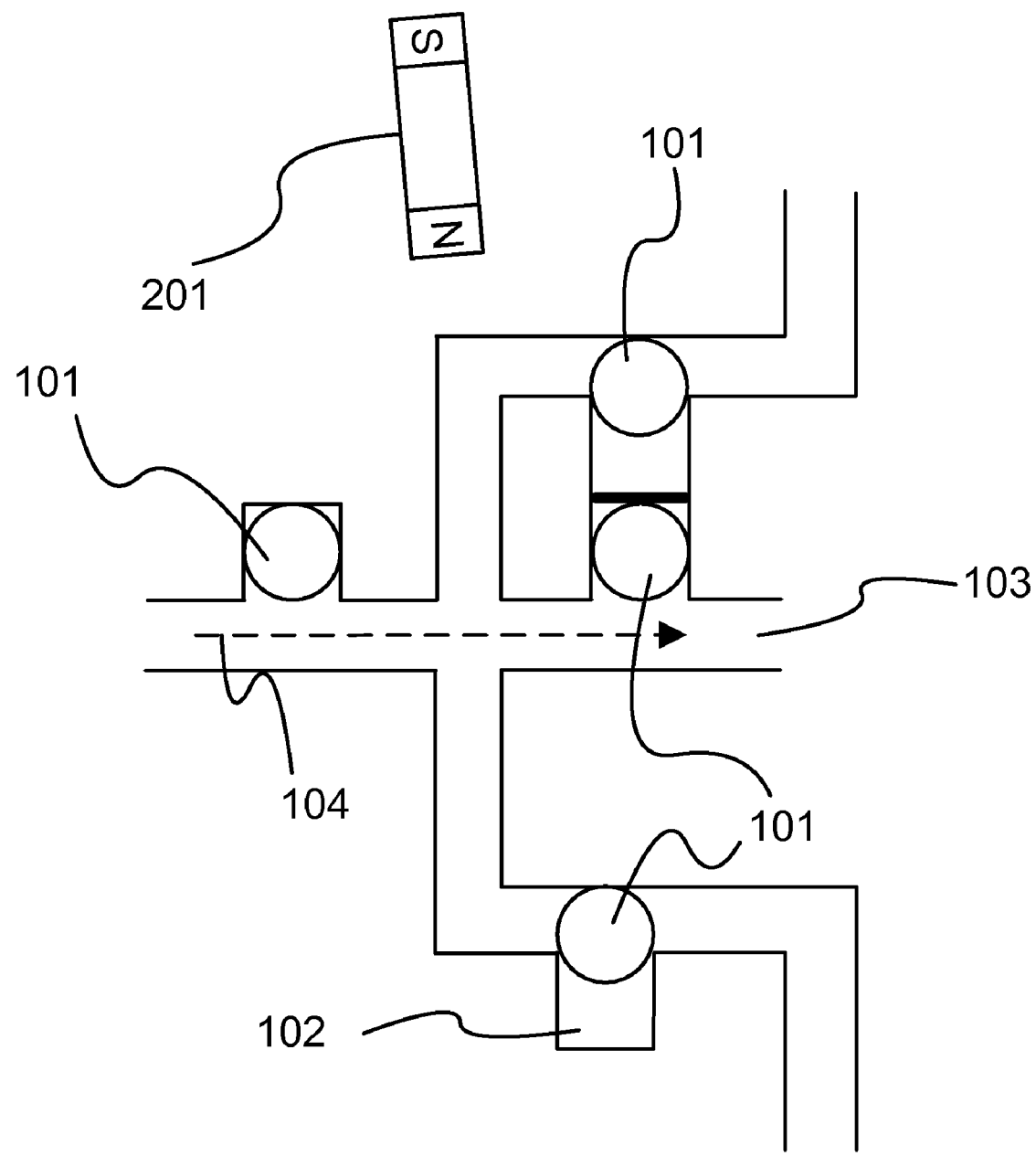
FIG. 4 illustrates schematically another configuration of the present invention at a crossing of two microchannels to allow a horizontal flow.
Figure 5:
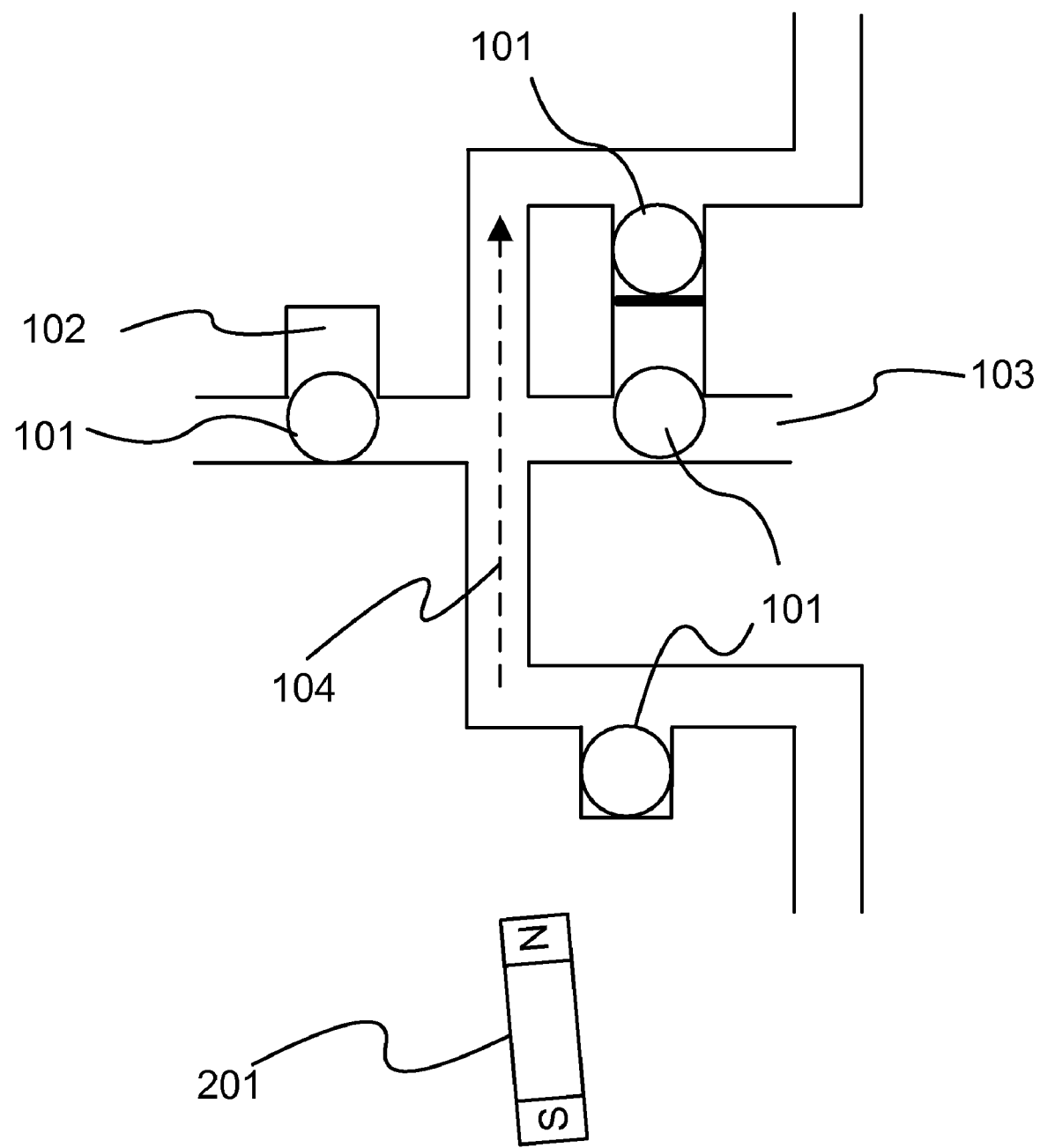
FIG. 5 illustrates schematically another configuration of the present invention at a crossing of two microchannels to allow a vertical flow.

In another embodiment, as shown in FIGS. 2 and 3, both beads move from one state to the other state simultaneously. That is, the beads move up or down together. Another variation of this embodiment is one-step flow control in crossing channels with double valves as shown in FIG. 4 and FIG. 5. Similar to the previous case, by using double valves, the two different cases for the flow can be achieved.

In one embodiment, a capillary-driven microfluidic chip with two sets of independent microchannels is actuated using magnetic valves in the regions where the microchannels cross. The magnetic valves are actuated externally by moving by hand a magnetic element over the chip in one direction.

Figure 6:
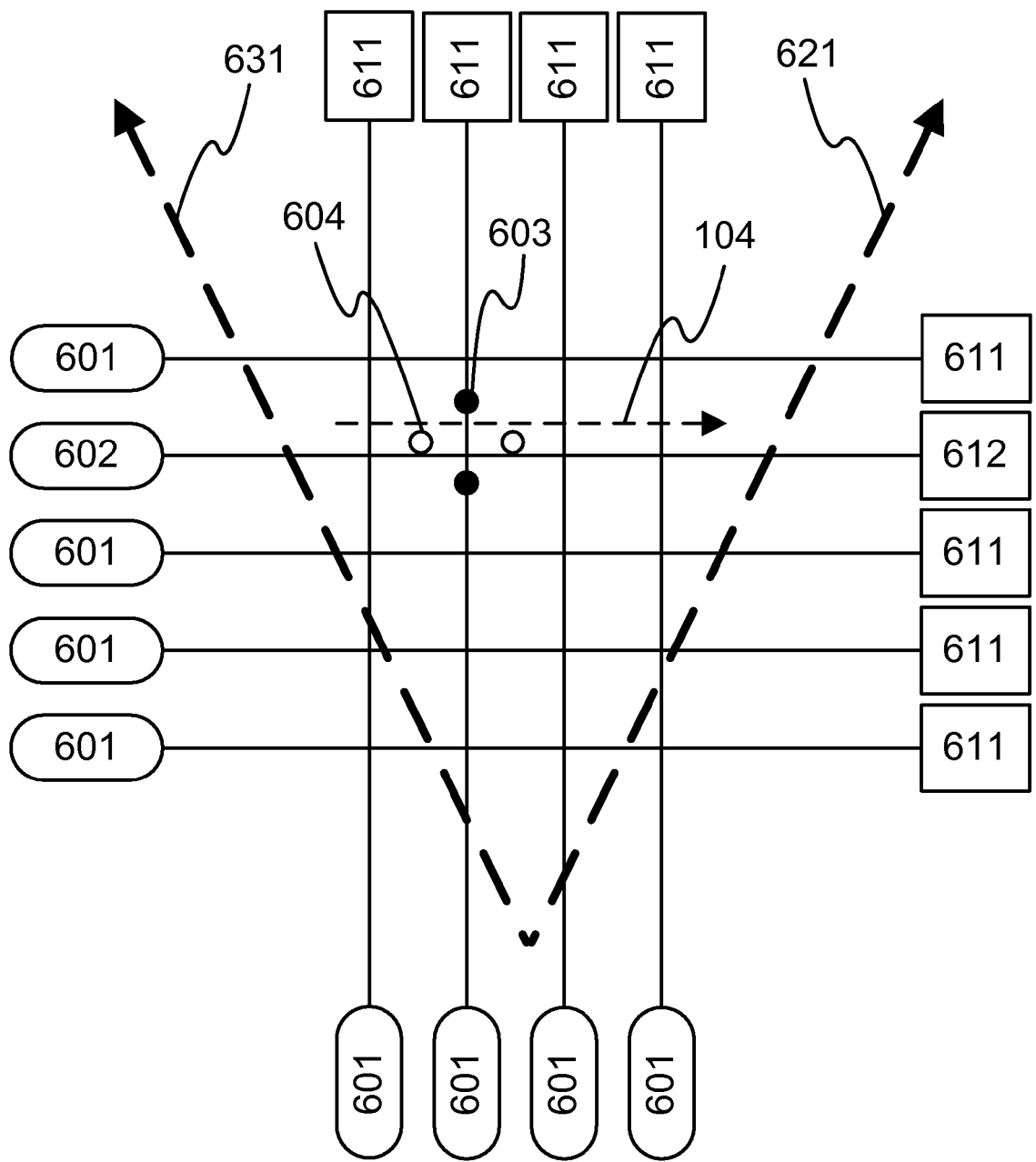
FIG. 6 illustrates schematically another configuration of the present invention as arrays comprising crossings of multiple microchannels to allow a horizontal flow by simple positioning or movement of the guiding magnet.

As examples, shown as filled circles (603) for closed or empty circles (604) for open status, or before crossing an outerchannel, micromosaic immunoassays can be done using one chip as shown in FIG. 6, by using arrays of crossing channels (connecting reservoir 601 to pump 611) and having one valve per channel per crossing. Actuation is simple, fast, and reversible, and can be done by moving the magnet by either bare hand or machine. The mechanism of this process is shown in path 104 in FIG. 6 for a route connecting the reservoir 602 to pump 612.

In one embodiment, micro magnetic valves control the direction of flow in each of the microchannels at the microchannels crossings. As mentioned before, in the current example, magnetic valve (205 and 206) comprises a magnetic bead in a chip cavity made in a microchannel.

The direction of the flow is, for this example, from the filling ports on the loading pad (601, 602) to the capillary or other type of pumps (611, 612). In this example, the direction and trajectory for passing an external magnet over the valves is not critical (either of 621 or 631 paths would work).

Figure 8:
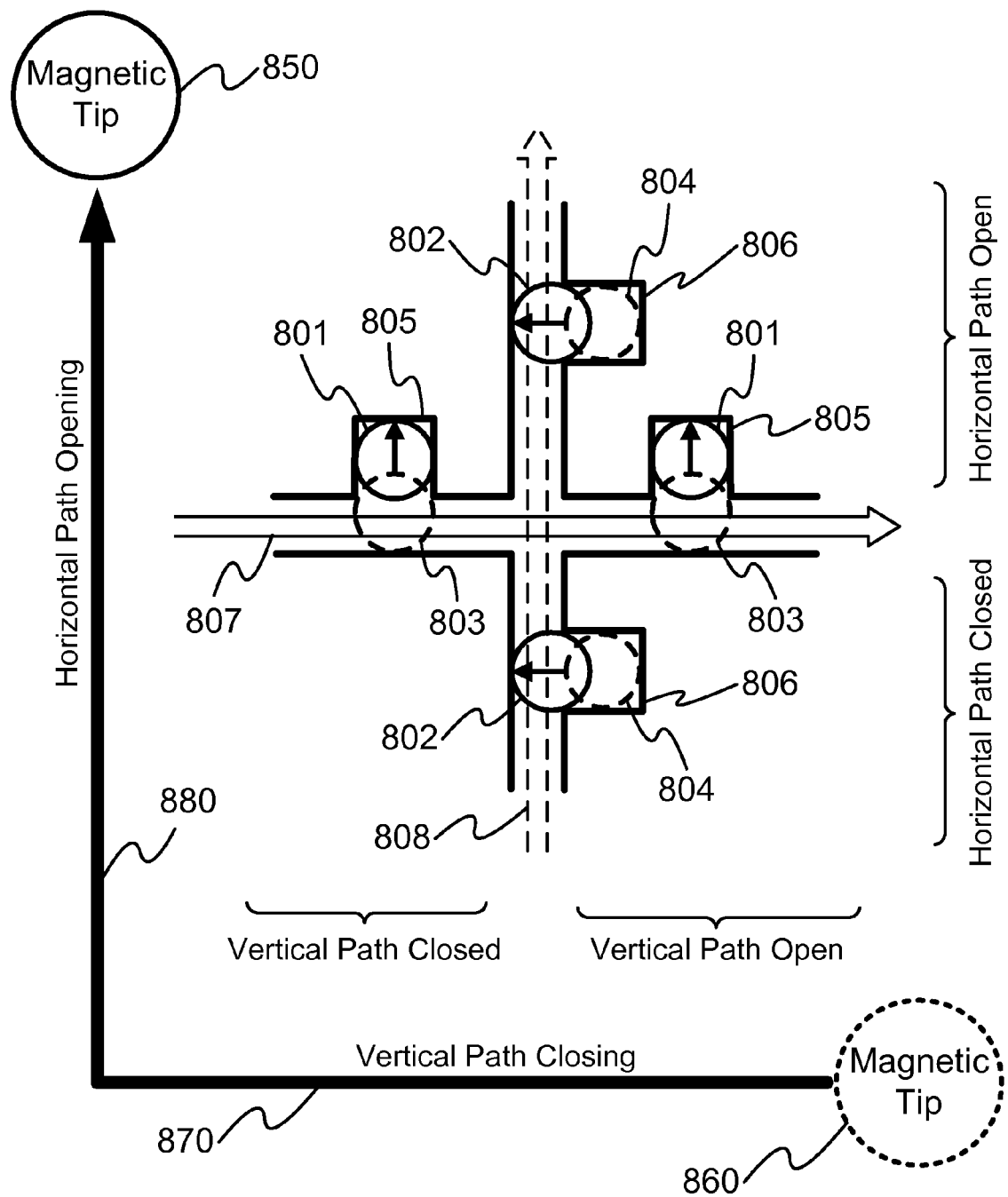
FIG. 8 illustrates a configuration of the present invention at a crossing of two microchannels to allow one, none, or both horizontal flow and vertical flow.

FIG. 8 shows a configuration of magnetic valves at a cross section of two channels. In one embodiment, (one or) two valves (805) on the horizontal channel control the horizontal flow (807). And (one or) two valves control on vertical channel control the vertical flow (808). If the magnet is placed on the left side of the channel cross section, the vertical valves close as the magnetic beads (802) close the vertical channel and prevent the vertical flow. On the other hand, if the magnet is at the right side of the cross section, the vertical valves open as their magnetic beads (804) move away from the vertical flow. Similarly, when the magnet is at top of the channel cross section (i.e., top of FIG. 8), the horizontal valves open the horizontal flow as their beads (801) move up. Also, when the magnet is at the bottom of the cross section, the magnetic beads (803) block the horizontal flow. Therefore, in this configuration, the state of the valves follows the particular quadrant (with respect to the cross section) the magnet is located, i.e., one or both vertical and horizontal channels can be open or closed. In one embodiment, as shown in FIG. 8, when a course magnet or a fine magnetic tip moves from location lower right quadrant (860) to top left quadrant on path, the vertical channel closes as the magnet moves on its horizontal portion of its path (870), and the horizontal channel opens as the magnet moves along its vertical portion of its path (880).

Figure 7:
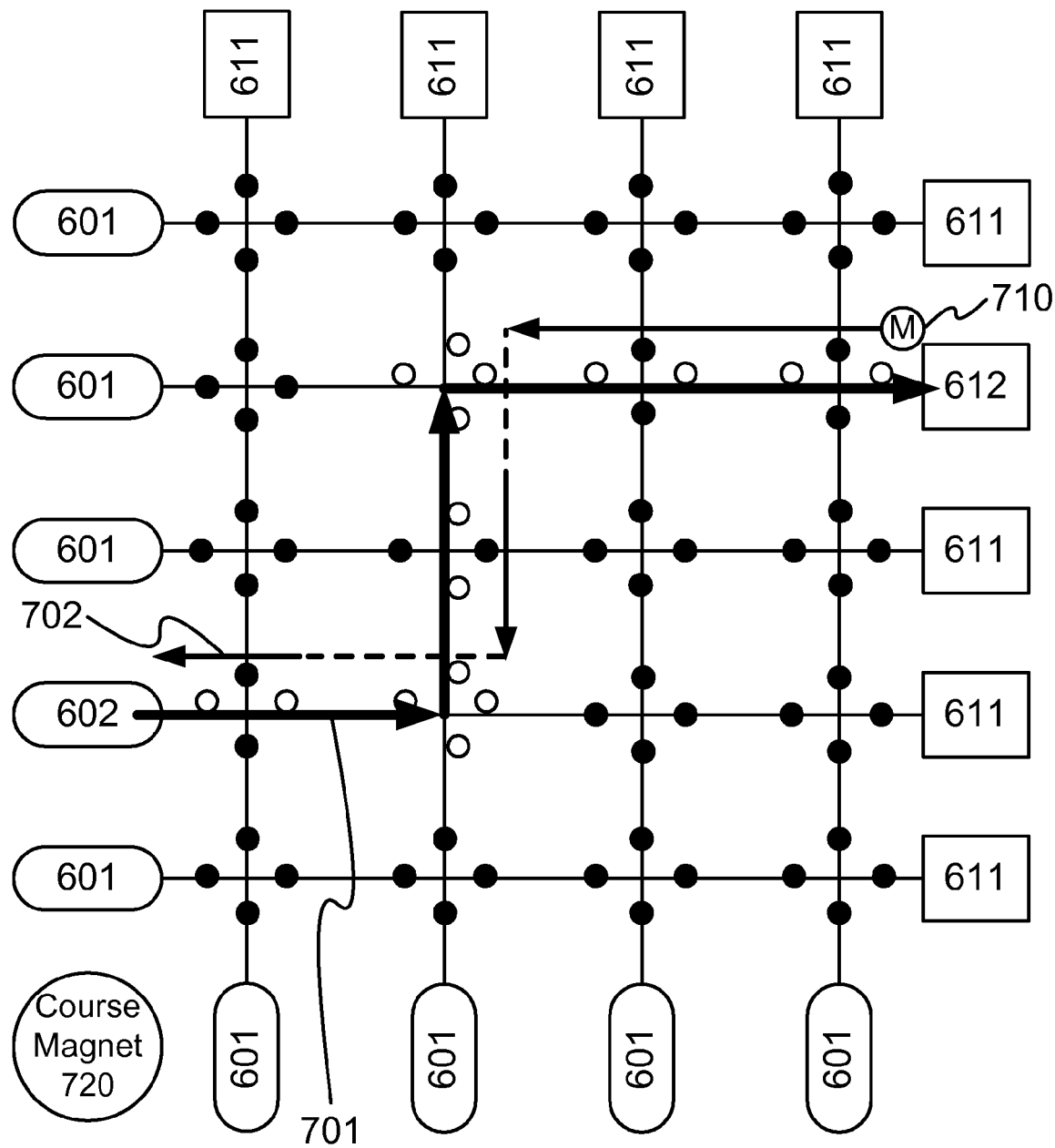
FIG. 7 illustrates schematically another configuration of the present invention as arrays comprising crossings of multiple microchannels to specify the desired exact routes for the flow by exact, or more controlled, positioning or movement of the guiding magnetic tips.

In one embodiment, if valves can be individually addressed using a magnetic tip (710), complete flow control can be achieved throughout the array as shown in FIG. 7. In one embodiment, the specific flow routes (e.g. 701) from reservoir (602 in FIG. 7) to pump (612 in FIG. 7) can be chosen by selectively closing and opening the valves in the route of the flow using the magnet tip. In such an embodiment, the magnetic strength of the tip is such that it is only effective in short range. Once a valve is brought in position, it will stay in the position even when the magnetic tip is moved out of the range. In one embodiment, a similar valve arrangement shown in FIG. 8 is used at each cross section shown in FIG. 7, where the black dots represent closed valves blocking the channel and the white circles represent the open valves for letting flow through. In such an embodiment, a relatively course and strong magnetic field can be used initially to reset the position of all the magnetic values. For example, a course magnet (720) can be placed at lower left corner of the array to force close both the vertical and horizontal valves on all the channel crossings. Then, the course magnet can be either moved away or turned off (if electrically induced). Then, a fine magnetic tip (710) can be moved along a path (702) from the pump (612) to reservoir (602) as shown in FIG. 7. The solid line along the path (702) represents the location of the magnetic tip where the tip is near the substrate, so it can affect the nearby valves. Therefore, as the tip moves horizontally to the left and crosses vertical channels, it will close those vertical channels. The dotted portion of the tip path represents the portion that the path where the magnetic tip is either turned off or lifted above the substrate so that its diminished magnetic field near the valves will not cause the valves to switch position when the tip is crossing channels. As shown, when the magnetic tip path is above and parallel to a horizontal channel, the horizontal valves are opened, and when the path of the tip is parallel and to the right of a vertical channel, the vertical channel is opened.

The aforementioned teaches one example of an application of the present invention to allow flow control in two dimensions. Other embodiments of the present invention can comprise similar flow controls in three dimensions when multiple substrates are stacked on each other with vertical vias through a substrate connecting the channels on one substrate to channels on another substrate. This way, with two fluid paths that would otherwise intersect in a two dimensional flow, one fluid path can be rerouted through vias to another substrate to prevent mixing of the paths.

A method comprising one of the following steps, features, or items is an example of the invention: performing multi-dimensional assays, fabrication of two series of crossing microchannels, producing a proximal magnetic field, placing guiding magnet in the vicinity of the chip, controlling fluid flow in one, two or three dimensions, forcing one or more magnetic beads to move in a cavity, repositioning the guiding magnet, actuating the magnetic valves, or using the apparatus or system mentioned above, for the purpose of the current invention or performing multi-dimensional assays using one microfluidic chip.

Any variations of the above teaching are also intended to be covered by this patent application.

The invention claimed is:

1. An apparatus for performing multi-dimensional assays using a microfluidic chip, said apparatus comprising:
   a first plurality of micro-channels on said microfluidic chip;
   a second plurality of micro-channels on said microfluidic chip;
   wherein said first plurality of micro-channels cross second plurality of micro-channels at a plurality of micro-channel crossings on said microfluidic chip;
   wherein a first micro-channel of said first plurality of micro-channels and a second micro-channel of said second plurality of micro-channels cross each other at a first micro-channel crossing of said plurality of micro-channel crossings;
   a plurality of magnetic valves; and
   a guiding magnet;
   wherein said guiding magnet produces a proximal magnetic field gradient at a location of each of said plurality of magnetic valves when an operator places said guiding magnet in a vicinity of said chip;
   wherein a first magnetic valve of said plurality of magnetic valves controls fluid flow in said first micro-channel at said first micro-channel crossing, and a second magnetic valve of said plurality of magnetic valves controls fluid flow in said second micro-channel at said first micro-channel crossing;
   wherein each magnetic valve of said plurality of magnetic valves comprises a magnetic bead and a cavity on said chip next to a corresponding micro-channel section;
   wherein said magnetic bead comprises:
   a magnetic volume element;
   wherein said magnetic volume element forces said magnetic bead to move along a cavity length of said cavity in response to said proximal magnetic field gradient, and a bead surface cover,
   wherein said bead surface cover provides chemical resistance and reduces friction and stiction of said magnetic bead within said cavity;
   wherein said cavity length is perpendicular to said corresponding micro-channel section, and said cavity length has a closed end away from said corresponding micro-channel section and an open end at said corresponding micro-channel section;
   wherein said each magnetic valve is at an on state, if said magnetic bead is at said closed end of said cavity length allowing fluid flow through said corresponding micro-channel section;
   wherein said each magnetic valve is at an off state, if said magnetic bead is at said open end of said cavity length blocking fluid flow through said corresponding micro-channel section;
   wherein said vicinity of said chip comprises a plurality of guiding magnet position ranges;
   wherein said operator repositions guiding magnet within said plurality of guiding magnet position ranges in order to actuate said plurality of magnetic valves simultaneously;
   wherein if said guiding magnet is within an on-off position range of said plurality of guiding magnet position ranges, then simultaneously said first magnetic valve is at said on state, and said second magnetic valve is at said off state; and
   wherein if said guiding magnet is within an off-on position range of said plurality of guiding magnet position ranges, then simultaneously said first magnetic valve is at said off state, and said second magnetic valve is at said on state.

* * * * *